United States Patent
Hollingworth et al.

(10) Patent No.: US 9,638,387 B2
(45) Date of Patent: May 2, 2017

(54) LIGHTING UNITS FOR ROAD USERS

(71) Applicant: Crawford Hollingworth, Oxford (GB)

(72) Inventors: Crawford Hollingworth, Oxford (GB); Catherine Louisa Hollingworth, Oxford (GB); Joss Newberry, London (GB)

(73) Assignee: Crawford Hollingworth (GB)

( * ) Notice: Subject to any disclaimer, the term of this patent is extended or adjusted under 35 U.S.C. 154(b) by 207 days.

(21) Appl. No.: 14/389,737

(22) PCT Filed: Apr. 3, 2013

(86) PCT No.: PCT/GB2013/050871
§ 371 (c)(1),
(2) Date: Sep. 30, 2014

(87) PCT Pub. No.: WO2013/150297
PCT Pub. Date: Oct. 10, 2013

(65) Prior Publication Data
US 2015/0055360 A1 Feb. 26, 2015

(30) Foreign Application Priority Data

Apr. 4, 2012 (GB) .................................. 1206071.1
Jul. 6, 2012 (GB) .................................. 1212065.5

(51) Int. Cl.
*F21S 8/10* (2006.01)
*B62J 6/02* (2006.01)
(Continued)

(52) U.S. Cl.
CPC ............ *F21S 48/2243* (2013.01); *B60Q 1/26* (2013.01); *B60Q 1/2696* (2013.01); *B60Q 1/46* (2013.01);
(Continued)

(58) Field of Classification Search
CPC ......... F21S 48/2243; B60Q 1/26; B60Q 1/46; B60Q 1/50; B62J 6/02; B62J 6/04; G09F 13/18; G09F 21/04
See application file for complete search history.

(56) References Cited

U.S. PATENT DOCUMENTS 2,011,850 A     8/1935    Clarke
6,094,849 A *   8/2000    Phillips ................ G02B 6/0095
                                                                                     40/546
(Continued)

FOREIGN PATENT DOCUMENTS

DE    202005003397 U1    5/2005
DE    202009007455 U1    8/2009
(Continued)

OTHER PUBLICATIONS

PCT International Search Report and Written Opinion for International Application No. PCT/GB2013/050871 dated Jun. 7, 2013.
(Continued)

*Primary Examiner* — Mary Ellen Bowman
(74) *Attorney, Agent, or Firm* — Tumey L.L.P.

(57) ABSTRACT

A lighting unit (85) for use by a vulnerable road user such as a cyclist, the lighting unit being intended for use as a front light or a rear light, wherein the lighting unit displays a symbol or word that identifies the category of vulnerable road user. It may incorporate two distinct lights: one which is set to achieve light delivery comparable to current standard white front and red rear bike lights, whilst the other is the symbol or word display. The symbol or word display is designed to increase driver recognition, to improve driver reaction time, and to prime appropriate driving behaviour. For example the lighting unit (95) may be a rear light or a front light for a bicycle (10), arranged to display (80) the word BIKE or a symbol of a cyclist on a bicycle. The lighting unit (95) may also include a light source (103) with an external focusing lens.

14 Claims, 4 Drawing Sheets

(51) Int. Cl.
  *B62J 6/04*   (2006.01)
  *B60Q 1/50*   (2006.01)
  *B60Q 1/26*   (2006.01)
  *B60Q 1/46*   (2006.01)
  *G09F 13/18*  (2006.01)
  *G09F 21/04*  (2006.01)
  *B62J 99/00*  (2009.01)

(52) U.S. Cl.
  CPC  *B60Q 1/50* (2013.01); *B62J 6/02* (2013.01); *B62J 6/04* (2013.01); *G09F 13/18* (2013.01); *G09F 21/04* (2013.01); *B62J 2099/008* (2013.01); *B62J 2099/0026* (2013.01); *F21S 48/215* (2013.01)

(56) References Cited

U.S. PATENT DOCUMENTS

| | | |
|---|---|---|
| 2005/0024884 A1 | 2/2005 | Seminara et al. |
| 2005/0104741 A1 | 5/2005 | Kimbrough |
| 2006/0225328 A1* | 10/2006 | Hasan .................... G09F 13/18 40/570 |
| 2010/0225459 A1* | 9/2010 | Lee ........................ B60Q 1/503 340/432 |
| 2011/0205760 A1* | 8/2011 | Ashoff ................. G02B 6/0021 362/612 |
| 2014/0185314 A1* | 7/2014 | Schattinger ............. G09F 13/18 362/602 |
| 2014/0331533 A1* | 11/2014 | Hasan ................. G09F 13/0413 40/570 |

FOREIGN PATENT DOCUMENTS

| | | |
|---|---|---|
| DE | 202010002934 U1 | 8/2010 |
| FR | 2921313 A1 | 3/2009 |
| WO | 2008/006143 A1 | 1/2008 |

OTHER PUBLICATIONS

UK Search Report for Application No. GB1206071.1 dated Aug. 3, 2012.

* cited by examiner

LIGHTING UNITS FOR ROAD USERS

This invention relates to lighting units for road users, in particular lighting units for road users that are significantly more vulnerable than drivers of motor vehicles such as cars.

The invention is applicable to road users such as bicycles and tricycles, cycle rickshaws, horses, horse-drawn vehicles, and invalid carriages that are often comparatively slow, and therefore are at risk of being run into from behind by faster-moving vehicles, and whose riders would typically be more vulnerable in an accident. In congested traffic, it will be appreciated that bicycles may in practice be faster than cars, and indeed this can itself lead to accidents, if a motorist does not notice a bicycle behind him or passing him. In this document such comparatively slow road users and vulnerable road users are collectively referred to as 'vulnerable road users'.

There is generally a requirement that any such vulnerable road user should display a white light to the front and a red light to the rear when using the road at night, or at dawn or dusk or other conditions of poor visibility, and similar requirements apply to all road users. This helps other road users, and particularly drivers of faster motorised vehicles, to see the vulnerable road user, so reducing the risk of collision. In the United Kingdom, for example, at night a cycle must have white front and red rear lights, which must be lit. A cycle must also be fitted with a red rear reflector (and amber pedal reflectors, if manufactured since 1 Oct. 1985), so taking advantage of the light from the headlights of other vehicles. Flashing lights are permitted but it is recommended that cyclists who are riding in areas without street lighting use a steady front lamp. Flashing lights should flash at between 1 and 4 times a second, and should have a brightness of at least 4 candelas. Similar regulations apply in many countries.

The use of lights, particularly for night riding, is recommended as a basic safety precaution, even in a well-lit urban context. In recent years increasing numbers of people are commuting to work, and people are encouraged to use bicycles to reduce costs and to provide exercise; however, cities have ever longer rush hours, morning and evening, and it is during such rush hours that most accidents happen. Furthermore, on busy roads, the cognitive functions of drivers of faster vehicles such as cars, lorries, trucks, vans and motorbikes may be overloaded, as there is so much information to take in. There is a particular issue in conditions of reduced light, for example morning and evening, when it can be difficult to tell, among multiple white lights behind or multiple red lights in front, which vehicle is which, as it is hard to judge perspective, for example to distinguish between a distant light on a car and a nearby light on a bicycle. In an urban context there are also likely to be many other light sources, which adds to this problem.

There is therefore a significant problem of people being injured in such accidents, and vulnerable road users are particularly susceptible to injury. There is a recognised need to improve the safety of such vulnerable road users.

Neuro-scientific research has shown that many of a driver's cognitive functions may take place without requiring conscious decisions, and that much mental behaviour is subconscious and automatic. This could be considered a sign of cognitive efficiency, but there is clearly a risk that the slower or more vulnerable road user will not be correctly identified before it is too late to prevent a collision, particularly if the driver's attention has been distracted, for example by other vehicles. Since commuter drivers typically follow the same route every day, they may be functioning to a significant extent on 'autopilot', and indeed may be unable to remember features of their journey subsequently.

There is a further problem arising from the fact that many people's eyesight is less than perfect in poor light. This can exacerbate the problems described above of correctly identifying vehicles on crowded roads, particularly during rush hour commutes during winter.

To some extent these issues are addressed by providing road users such as cyclists with flashing rear lights, as a flashing light will stand out amongst the fixed lights of other motor vehicles so the cyclist is therefore more likely to be noticed.

Additional lighting has also been proposed, for example US 2012/0063133 (Sherwin) describes a light emitting diode array built into a tubular lens in a mast which can be installed on a bicycle. In use the mast would be set up vertically, behind the cyclist, and the light pattern produced by the diode array can be varied. This provides the benefit not only of flashing lights but also increased height. U.S. Pat. No. 8,075,168 (Shoolman) describes a bicycle provided with pairs of bright non-flashing lights that extend out on both sides of the bicycle, above the height of the bicycle frame, so as to make the bicycle appear wider, and so more prominent and conspicuous to motorists.

According to the present invention there is provided a lighting unit for use by a vulnerable road user, and being intended for use as a front light or a rear light by the vulnerable road user, wherein the lighting unit displays a symbol or word that identifies the category of vulnerable road user.

The lighting unit may also comply with the requirements for a conventional front light or a rear light for the vulnerable road user. Indeed the lighting unit may comply with the standards set for such a front light or rear light.

This is equally applicable to front lights or rear lights, or to both front lights and rear lights, as the lighting unit may for example display the symbol or word in white light (for the front) or in red light (for the rear).

It is expected that a symbol or word will stimulate the left hemisphere of the brain of the driver of another vehicle in the vicinity of the vulnerable road user, whereas colour stimulates the right hemisphere. More generally the right hemisphere is associated with recognising faces, expressing emotions, music, and intuition, as well as colour; whereas the left hemisphere is more concerned with logic, reasoning, numbers, language and critical thinking. Stimulating the left hemisphere may enhance the driver's conscious awareness of the vulnerable road user. But at the same time the colour and other non-verbal features of the lighting unit will have an impact on the right hemisphere, so activity in both hemispheres of the driver's brain is stimulated by the light of the invention. A symbol may also stimulate the left hemisphere. In any event the provision of a coloured and illuminated symbol or word can be expected to stimulate or activate more parts of the brain, in different ways, leading to greater overall awareness.

In addition, symbols and words can act as subconscious behavioural primers. For example if the word BIKE or the cyclist symbol is displayed, this may prime the driver to make various associations with bicycles, such as vulnerability and erratic behaviour. This may make the driver more aware of the vulnerable road user even if at a subconscious level, and prime the driver to act more carefully. It may also make the driver more aware of other aspects of his journey. Hence the lighting unit can be expected to achieve quicker recognition of the vulnerable road user by other road users, and shorter reaction times of other road users, as the lighting unit primes appropriate behaviour, and creates more relevant associations in the minds of other road users.

The lighting unit may provide a steady light, or it may flash. In the latter case it may flash randomly (if that is legally acceptable), or regularly. The flashing may be such that the letters of the identifying word or the lines of the symbol are displayed successively, or other ways that highlight the word or symbol and increase its impact.

It will be appreciated that the identifying word is preferably a word in a language used in the country where the vulnerable road user is using the road. It is also preferable that the word should have no more than five letters, so it can be rapidly perceived; in some languages it may therefore be appropriate to display an identifying word that is an abbreviation rather than a complete word. The letters making up the word may be all capitals, or all lower case, or a combination that makes the word easier to identify. By way of example an appropriate word would be BIKE for an English speaking country, as this is shorter than the word "bicycle". Suitable words may be VELO in a French-speaking country, RAD in a German-speaking country, FIETS in a Dutch-speaking country, CYKEL in a Danish or Swedish-speaking country, SYKKEL in a Norwegian-speaking country, and BICI in an Italian-speaking or Spanish-speaking country. Drivers in a country will become used to seeing the appropriate word displayed by vulnerable road users in that country. If vulnerable road users such as cyclists are intending to travel in countries where different languages are spoken, it may therefore be appropriate for the lighting unit to be programmable to display words in different languages.

If, instead, the lighting unit displays an identifying symbol, this may be a character such as a Chinese character that represents the nature of the vulnerable road user, or it may be a widely-recognised symbol and representing the nature of the vulnerable road user, such as the symbols used on road signs, or a symbol representing a cyclist on a bicycle.

It will be appreciated that other words or symbols would be required for other vulnerable road users, for example a horse or horse-drawn vehicle might display a light with the word HORSE in an English-speaking country, PFERD in a German-speaking country, etc, or a symbol representing a horse.

The symbol or word may be displayed by means of an array of discrete light sources such as light emitting diodes (LEDs), as these are electrically efficient and can provide bright light. The letters may therefore be made up of dots, each dot corresponding to an LED. Alternatively each letter, word or symbol may be illuminated substantially uniformly.

As regards the display of the symbol or word, this should be clearly visible from a distance. This may be achieved by providing a uniformly-illuminated symbol or word, without any lens to focus the light from the symbol or word. This uniform illumination may for example utilise edge-lighting. The uniformly-illuminated symbol or word may emit diffuse light, to be viewable over a wide range of angles. Where the lighting unit takes the place of a front light or a rear light, and so must comply with the requirements for a front light or a rear light, these requirements may be achieved by providing a light source combined with a focusing lens. In particular the symbol or word may be displayed without an external lens, so as to be visible from a range of different directions; while the display may also include a light source combined with an external lens to provide a beam or cone of light; and these two different features of the lighting unit may use different types of illumination. Consequently a preferred embodiment of the invention combines both a uniformly-illuminated symbol or word, displayed without an external focusing lens, and also a light source combined with a focusing lens to provide a beam or cone of light. Nevertheless there may be situations in which the symbol or word is displayed with an external lens.

Hence, the present invention provides a lighting unit for use by a vulnerable road user, and being intended for use as a front light or a rear light by the vulnerable road user, wherein the lighting unit displays a symbol or word that identifies the category of vulnerable road user, and the lighting unit also includes a light source combined with a focusing lens to provide a beam or cone of light. It is one lighting unit which incorporates two distinct lights: one which is set to achieve light delivery comparable to conventional white (front) and red (rear) lights; whilst the illuminated symbol or word is designed to increase driver recognition and shorten driver reaction time, and to prime appropriate driving behaviour.

The light source combined with the focusing lens preferably complies with the standard requirements for a front or rear light, for example as specified by BS 6102/3.

The light source is preferably provided by one or more LEDs, as these can provide the required brightness, while having low power consumption. This is preferably able to operate in different modes, such as a steady illumination, and flashing, selected and operated by a switch that actuates a control unit. It may also be possible to control the brightness. The light source combined with the focusing lens may be arranged to provide a light beam which is directed slightly below the horizontal, for example by 3.5°, so as to minimise the dazzling effect on other road users, whilst providing broad illumination. The rear light meanwhile may be required to distribute light over a wider range of angles, to each side, and so multiple LEDs may be used in addition to lenses, whether integral to the casing or included as secondary optical elements within it. The light source may include a plurality of LEDs arranged in a vertical line.

The symbol or word is preferably uniformly illuminated and displayed without an external focusing lens, so it can be seen from a range of different directions. To provide good contrast, the symbol or word may be defined in an opaque material, for example by a stencil. For a slim structure the illumination of the symbol or word may be provided by an edge-lit sheet of transparent material, so light is transmitted through the sheet. There are benefits in providing reflective surfaces on all the edges, apart from the locations of the LEDs, to limit loss of light from those edges; these edges may therefore be covered with a white or silver film/tape or other reflective material.

So the light reaches the symbol or word, the rear of the sheet may be provided with a diffusely scattering surface, either by providing the transparent material with a textured surface, for example with grooves; or by a diffusely-scattering layer of material adhered to the rear of the sheet, for example a layer of white plastic, or a pattern of dots printed on a transparent sheet. Such a diffusely scattering rear surface scatters light towards the front surface so it illuminates the word or symbol. Alternatively the front of the sheet may be provided with a textured surface so that light is refracted out to illuminate the word or symbol. For example the textured surface of the front of the sheet may be in the form of micro-prisms, for example of an inverted pyramid shape. Such a textured surface may be provided only in those portions of the surface where light is required to shine through the stencil.

In one embodiment, where a bicycle is provided with both a front light and a rear light of the invention, these are removable from the bicycle, and can be clipped together for ease of storage, for example or to fit in a briefcase or in a pocket.

In another aspect, the present invention provides a reflector for use by a vulnerable road user, the reflector complying with the requirements for a front reflector or a rear reflector for the vulnerable road user, and being intended for use as a front reflector or a rear reflector by the vulnerable road user, wherein the reflector displays a symbol or word that identifies the category of vulnerable road user.

The invention will now be further and more particularly described, by way of example only, and with reference to the accompanying drawings in which.

Figure 1:
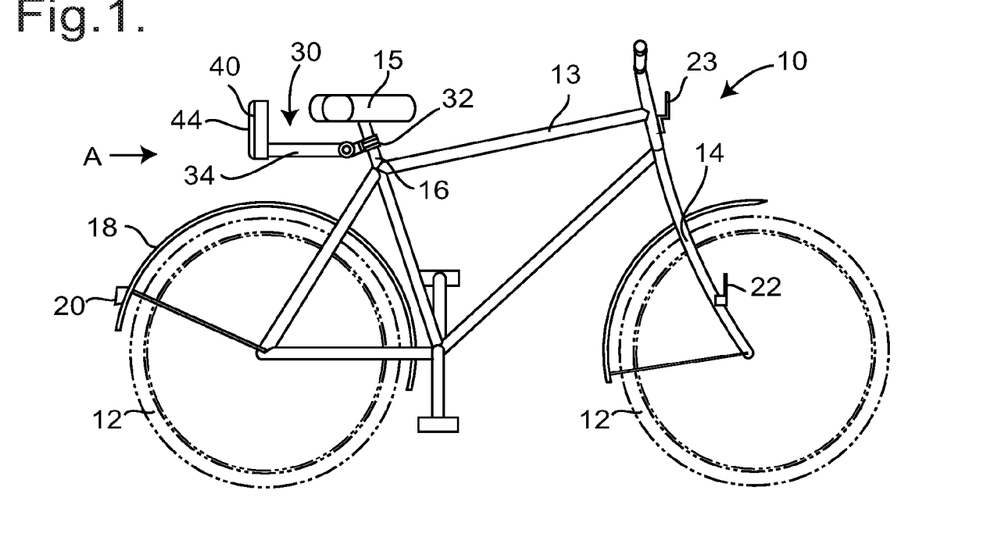
FIG. 1 shows a side view of a bicycle incorporating a rear light of the invention which incorporates a light emitting display.

The invention is applicable to any vulnerable road user, but will be described in relation to a bicycle. Referring to FIG. 1, a bicycle 10 (shown schematically) includes two wheels 12, a frame 13 and front forks 14. A saddle 15 is mounted on a seat post 16 that connects to the frame 13. The bicycle 10 includes a rear mudguard 18 which carries a rear reflector 20. On the front forks 14 is a bracket 22 to which a front light can be mounted; a second bracket 23 to which a front light can be mounted is provided on the front part of the frame 13. These features are all conventional, and as mentioned above the provision of a rear reflector 20 is a requirement in some countries.

Below the saddle 15 a rear light unit 30 is connected by a clamp 32 onto the seat post 16. The light unit 30 comprises a support frame 34 which can be adjusted relative to the clamp 32 so as to be horizontal. The light unit 30 also comprises a light emitting display 40 mounted at the rear of the support frame 34. When switched on, the light emitting display 40 acts as a rear light for the bicycle 10, emitting red light.

It will be appreciated that a rear light unit 30 of the invention may be mounted on the bicycle 10 at any position at which it is acceptable to mount a rear light. Equally, a front light unit (not shown) of the invention may be mounted on the bracket 22 or the bracket 23, or at other positions on the bicycle 10 at which it is acceptable to mount a front light. The rear light unit 30 and the front light unit may be powered by a dynamo, or by batteries, or indeed by any other suitable power source.

Figure 2:
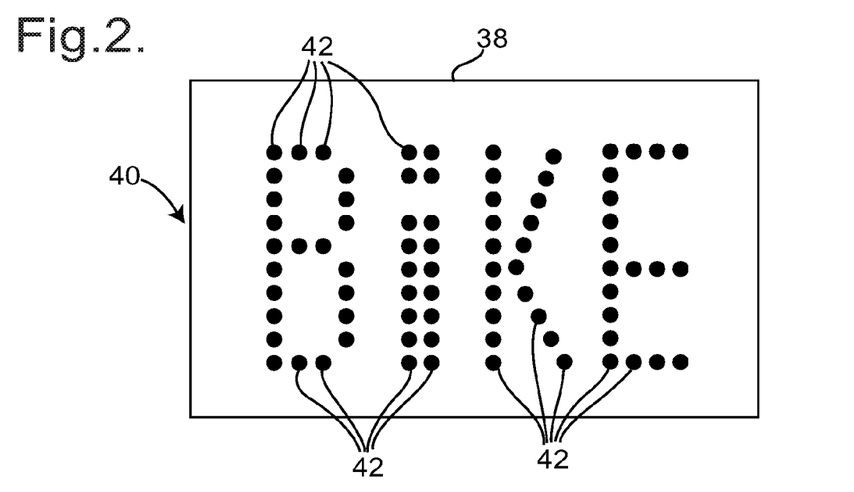
FIG. 2 shows a view of the rear light of FIG. 1, in the direction of arrow A of FIG. 1.

Referring to FIG. 2, the light emitting display 40 comprises a frame 38 surrounding an array of LEDs 42, which in this case are arranged to form the word BiKE. The LEDs 42 are enclosed within a transparent cover 44 (shown in FIG. 1), which may be coloured red for the rear light unit 30. The LEDs 42 may in this case emit either white light or red light, if the cover 44 is transparent only to red light. They may also be arranged to flash. In use, a motorist coming up behind a cyclist on the bicycle 10 has his attention attracted not only by the red rear light, but also by the word "bike" (which could instead be a cyclist symbol). The red light stimulates the right hemisphere of the motorist, but the presence of the word "bike" (or the cyclist symbol) should also stimulate the left hemisphere of the brain of the motorist. By stimulating both hemispheres, which react differently, the motorist is more likely to be aware of the cyclist at both a conscious and an unconscious level.

It will be appreciated that in this array, the letter i is represented by two parallel lines of LEDs 42. If the left-hand and right-hand lines of LEDs 42 that form the letter i are alternately illuminated, the letter would be more prominent because it flashes, while being continuously displayed.

In a modification the array of LEDs 42 is such that each vertically-extending line comprises a plurality of side-by-side LEDs (as is already the case for the letter i). In this case the displayed word may be flashed while being continuously displayed, by shifting the word sideways by one LED, to and fro.

The LEDs 42 are mounted on a printed circuit board (not shown), which would also support other circuit elements to control the operation of the LEDs 42, for example a flashing control circuit. Each LED 42 is provided with an integral lens or primary optic.

In a modification the entire area within the frame 38 is covered by an array of LEDs 42, but only those required to form the required word (e.g. BIKE) are illuminated. In this case again the word may be illuminated continuously, or may be flashed; and if it is flashed it may be shifted sideways by one or more LEDs so it is continuously displayed.

In this case the array of LEDs 40 would preferably be programmable to display a selection of words appropriate for different languages. Hence, for example, a cyclist travelling through Europe would be able to change the displayed word in accordance with the language spoken in the country through which he was cycling.

It will be appreciated that the cover 44 may act as a lens or secondary optic to direct light in desired directions. This may be required to comply with lighting regulations. The cover 44 may have the effect that the rear light unit 30 resembles a conventional rear light, with the cover 44 providing the effect of ensuring the transmitted light goes in the required directions, and maximising clarity.

Figure 3:
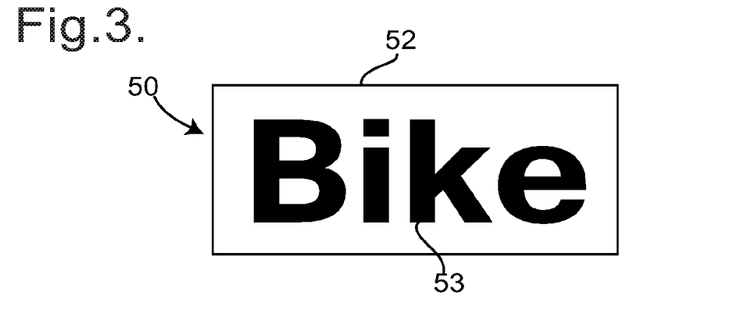
FIG. 3 shows a view equivalent to that of FIG. 2, showing an alternative light emitting display of the invention.

Referring to FIG. 3, an alternative light emitting display 50 is shown which comprises a frame 52 surrounding a uniformly illuminated word 53.

Figure 4:
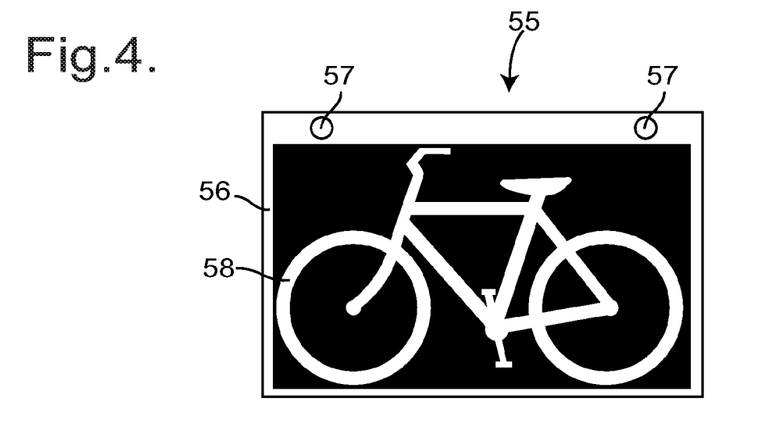
FIG. 4 shows a view equivalent to that of FIG. 3, showing an alternative light emitting display of the invention.

Referring to FIG. 4, an alternative light emitting display 55 is shown which comprises a frame 56 surrounding a uniformly illuminated symbol 58 representing a bicycle.

The display 55 is shown as being used in conjunction with two outward-facing conventional LEDs 57 (there may be a different number of these outward-facing LEDs 57). These may be provided with a plastic cover or lens (a secondary optic) to direct the light into a beam or cone, for example equivalent to the cover 44. Hence another road user such as a motorist would see not only the bright lights of the LEDs 57 but also the diffusely-illuminated symbol 58. The diffusely-illuminated symbol 58 would be visible from a wider range of angles. Such additional light sources (the LEDs 57) would be equally applicable to the light emitting display 50, in which case the bright lights would be seen in conjunction with the uniformly illuminated word 53.

Figure 5:
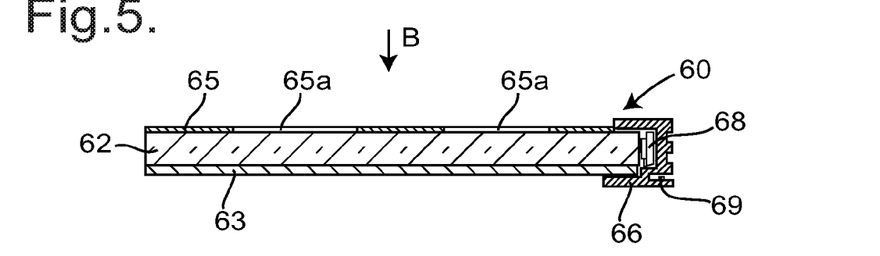
FIG. 5 shows a sectional view of an alternative light emitting display of the invention.

The displays 50 and 55 may be illuminated by transmitting light through a sheet of transparent material. For example, as shown in FIG. 5, which shows a sectional view through a display 60 which may correspond to the display 50 or the display 55, the display 60 includes a thin sheet 62 of optically clear plastic, such as an acrylic resin or polycarbonate resin, sandwiched between a white backing plate 63 and a metal front plate 65 in the shape of a stencil, in which the word 53 or the symbol 58 is cut out as shown at 65a, the remaining parts of the front plate 65 being reflective on the surface adjacent to the thin sheet 62. Along one edge of the thin sheet 62 is a metal moulding 66 which encloses a line of LEDs 68, arranged to transmit light into the edge of the thin sheet 64. The moulding 66 acts as a heat sink for the LEDs 68, and also encloses a cable 69 to supply electric power to the LEDs 68.

When the LEDs 68 are illuminated, light is diffused across the entire area of the thin sheet 62, because it is transparent, so as viewed from behind the bicycle 10, in the direction of arrow B, the portions 65a of the metal front plate 65 that are cut out are brightly lit, whereas the remaining portions of the front plate 65 are black. The word 53 or the symbol 58 is therefore brightly illuminated. In the case of a rear light unit, the LEDs 68 may emit red light, whereas in the case of a front light unit the LEDs 68 may emit white light.

Figure 6:
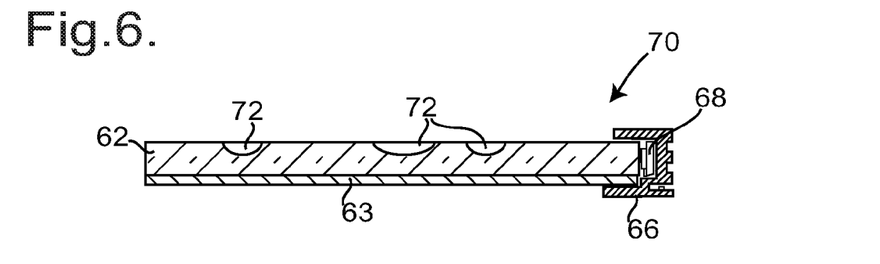
FIG. 6 shows a sectional view of a modification to the light emitting display of FIG. 5.

As shown in FIG. 6, a modified display 70 differs from the display 60 in not including the metal front plate 65, and in that the desired word 53 or symbol 63 is defined by etching away or cutting a groove 72 into the front surface of the thin sheet 62. In other respects the display 70 is the same as the display 60, identical components being referred to by the same reference numerals. In a further modification, the display 70 may also be provided with a metal front plate 65 in which the word or symbol is cut out, and this may provide enhanced contrast.

Figure 7:
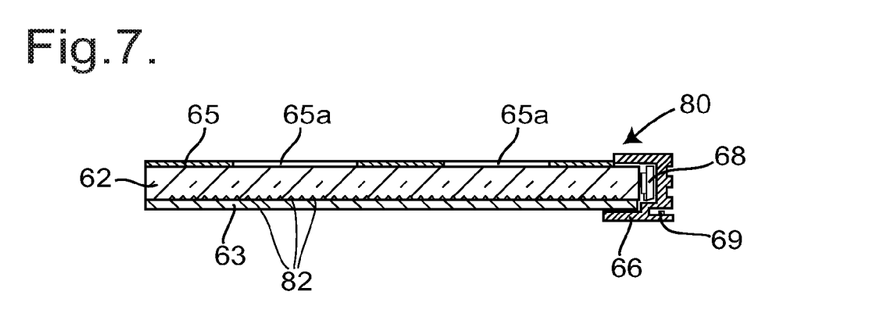
FIG. 7 shows a sectional view of a modification to the light emitting display of FIG. 5.

As shown in FIG. 7, a modified display 80 differs from the display 60 in that the rear surface of the sheet 62, which is adjacent to the white backing plate 63, is etched with a grid of closely-spaced narrow and shallow grooves 82 (shown schematically). These grooves 82 would typically be at a spacing of less than 2 mm, more preferably less than 1.5 mm, for example 1.0 mm, and define a square grid. These grooves 82 scatter the light from the LEDs 68 so that the white backing plate 63 is brightly illuminated. This ensures that as seen from a distance the word 53 or the symbol 58 cut out as a stencil from the metal front plate 65 is brightly and substantially uniformly illuminated. In other respects the display 80 is the same as the display 60.

The display 80 may be modified in various ways, while ensuring that the light reaches the symbol or word defined by the stencil in the front plate 65. Instead of the grooves 82, the rear of the sheet 62 may be provided with a diffusely scattering surface by a diffusely-scattering layer of material adhered to the rear of the sheet 62, for example a layer of white plastic, or a pattern of dots printed on a transparent sheet. Such a diffusely scattering rear surface scatters light towards the front surface so it illuminates the word or symbol. As another alternative, the front of the sheet 62 may be provided with a textured surface so that light is refracted out to illuminate the word or symbol. For example the textured surface of the front of the sheet 62 may be in the form of micro-prisms, for example of an inverted pyramid shape. Such a textured surface may be provided only in those portions of the surface where light is required to shine through the stencil. (Such micro-prisms are analogous to the grooves 72 shown in the display 70 of FIG. 6, but on a much smaller scale.)

The displays 60, 70 and 80 provide substantially uniform illumination of a word or symbol by shining light into an edge of a transparent sheet 62, and this may be referred to as edge lighting. It will be appreciated that the displays 60 and 80 that include a stencil provided by a metal front sheet 65 can be modified in that the stencil may be provided by a sheet of any opaque material.

It will be appreciated that the displays 40, 50, 55, 60, 70 and 80 are shown by way of example only, and that the desired word or symbol may be displayed in a range of other ways, for example using one or more bright LEDs to backlight a cut-out plate like the metal front plate 65.

In another example, a display may include an electroluminescent sheet, either of inorganic or organic materials, which may be in the shape of the desired word or symbol.

In every case the display may be used in combination with a number of outward-facing light sources, like the LEDs 57 shown in FIG. 4. These have the effect of conventional lights, and may enhance the visibility of the display. Where a lighting unit includes not only a display showing a symbol or word, but also light sources which have the effect of conventional lights, these may be illuminated in different ways. The different tasks may be solved by different lighting technologies. For example, an edge-lit display, such as the display 80 of FIG. 7, in which the symbol or word is uniformly and diffusely illuminated, may be combined with outward-facing LEDs 57, as shown in FIG. 4, provided with a lens or secondary optic to direct the light.

Alternatively, an edge-lit display may be combined with an external lens focusing light from at least part of the edge-lit display to form a beam or cone of light which complies with requisite standards.

Although the light emitting displays 40, 50, 55, 60 and 70 have been primarily described as rear lights, and so emitting red light, it will be appreciated that a substantially identical light emitting display may be used as a front light, if it emits an appropriately coloured light, for example white light (as described below in relation to FIG. 10).

Figure 8:
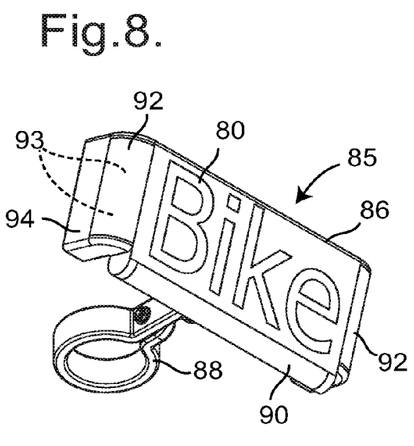
FIG. 8 shows a perspective view of an alternative rear light of the invention.
Figure 9:
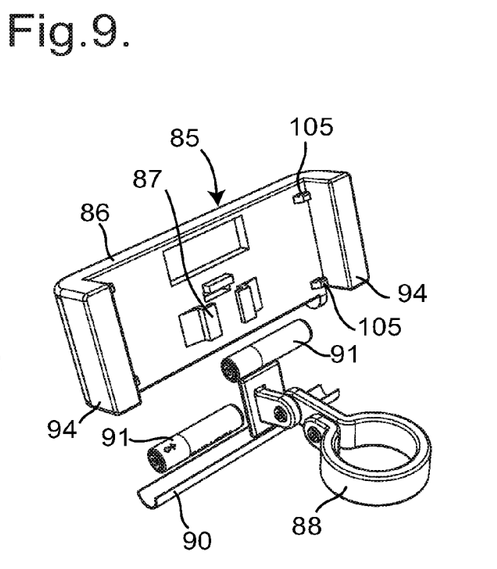
FIG. 9 shows a perspective back view of the rear light of FIG. 8, partly exploded.

Referring now to FIG. 8 a rear light unit 85 comprises a casing 86 of generally rectangular shape, and incorporates a display 80 (as described in relation to FIG. 7), which shows the word Bike illuminated in red. The back of the casing 86, as shown in FIG. 9, incorporates a clip 87 to connect on to a clamp 88 which may be attached to the frame of the bicycle 10, for example to the seat post 16. Along the underside of the casing 86, below the display 80, is a removable cover 90 which encloses two batteries 91. At each side of the edge-lit display 80 the casing 86 includes a red transparent plastic lens 92 (or secondary optic) which covers two rear-facing LEDs 93 (the locations of two of which are indicated by broken lines), and side portions 94 of the casing 86 project at the back to provide spacing between the LEDs 93 and the corresponding lenses 92 so that the light from LEDs 93 is projected as a beam or cone that complies with conventional standards for a rear light.

Hence, in use, as seen from behind the bicycle 10, the LEDs 93 in combination with the lenses 92 act as a conventional rear light, providing bright beams of red light directed behind the bicycle 10. The word Bike is illuminated on the edge-lit display 80, which does not include a lens. The absence of a lens, and the substantially uniform illumination of the word (or symbol), ensure that the word (or symbol) is visible from a wide range of different directions, and is visible to an approaching driver throughout their approach.

The edge-lit display 80 may be illuminated steadily, while the LEDs 93 may be illuminated steadily, or may be arranged to flash. Alternatively the edge-lit display 80 might be arranged to flash, while the LEDs 93 may be illuminated steadily. The combination in this way of a steadily illuminated light and also a flashing light, one of which displays a symbol or word, can be expected to draw greater attention to the vulnerable road user.

Figure 10:
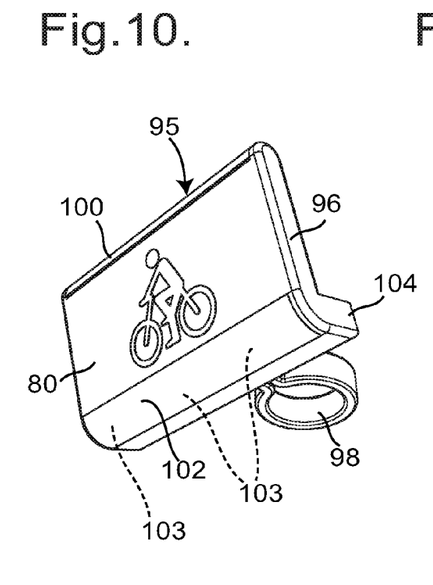
FIG. 10 shows a perspective view of a front light of the invention.

Referring now to FIG. 10, a front light unit 95 similarly comprises a casing 96 of generally rectangular shape, and incorporates a display 80 (as described in relation to FIG. 7) which, in this example, shows a bicycle symbol illuminated in white. As with the rear light unit 85, at the back side of the casing 96 is a clip (not shown) to connect onto a clamp 98 which may be attached to the front forks 14 of the bicycle 10 so as to take the place of the bracket 22. Along the top of the casing 96, above the display 80, is a removable cover 100 which encloses two batteries (not shown). Along the bottom of the casing 96 is a clear transparent plastic lens 102 (or secondary optic) which covers three forward-facing LEDs 103 (the locations of which are indicated by broken lines), and a bottom portion 104 of the casing 96 projects to provide spacing between the LEDs 103 and the corresponding lens 102 so that the light from the LEDs 103 is projected as a beam or cone that complies with conventional standards for a front light.

Hence, in use, as seen from in front of the bicycle 10, the LEDs 103 in combination with the lenses 102 act as a conventional front light, providing a bright beam of white light directed in front of the bicycle 10. The bicycle symbol is illuminated on the edge-lit display 80, which does not include a lens; the absence of a lens and the substantially uniform illumination ensure that the symbol (or a word) is visible from a wide range of different directions, and is visible to an approaching driver throughout their approach.

As with the rear light unit 85, in this case also the edge-lit display 80 may be illuminated steadily, while the LEDs 103 may be illuminated steadily, or may be arranged to flash. Alternatively the edge-lit display 80 might be arranged to flash, while the LEDs 103 may be illuminated steadily. In both the rear light unit 85 and the front light unit 95, different operation modes may be selected by means of a switch, and would be actuated by a control unit within the light unit. The various different operation modes may also involve changes in the brightness of the edge-lit display 80, or of the LEDs 93 or 103. The combination in this way of a steadily illuminated light and also a flashing light, one of which displays a word or symbol, can be expected to draw greater attention to the vulnerable road user. This concept is applicable in both a front light and a rear light; and to reiterate the light is a single unit which incorporates two distinct sources of light: one which is set to achieve light delivery comparable to current standard white (front) or red (rear) lights; whilst the other illuminates a symbol or word designed to increase driver recognition, to improve driver reaction time, and to prime appropriate driving behaviour. The provision of both a flashing light and a steady light is advantageous because the flashing light provides more stand-out while the static light helps drivers of motorised vehicles to judge distance and perspective.

Figure 11:
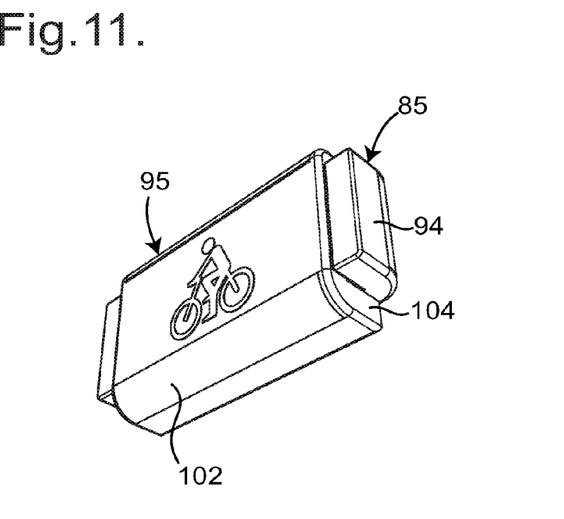
FIG. 11 shows a perspective view of the front light of FIG. 10 assembled with the rear light of FIG. 8.

In this example the casing 96 of the front light unit 95, when disconnected from the clamp 98, fits between the side portions 94 of the casing 86 of the rear light unit 85, when that is disconnected from the clamp 88. Hence, as shown in FIG. 11, the front light unit 95 and the rear light unit 85 fit together. There are clips 105 at the back side of the casing 86 (see FIG. 9) which engage with corresponding recesses (not shown) at the back side of the casing 96, so the light units 85 and 95 clip together so as to be easy to carry. The light units 85 and 95, when clipped together, may fit into a customised carrying case.

Each light unit 85 and 95 may be of a similar size to a mobile phone, for example the display 80 in each case may be of width 100 mm and of height 55 mm, so that the light units 85 and 95 either separately or together may be carried in a pocket or a bag. More generally the unit 85 or 95 may be of width less than 250 mm, preferably less than 150 mm, while the height may be less than 150 mm, preferably less than 80 mm. The letters in the display (considering the tallest letters) may be at least 20 mm high, and preferably more than 30 mm high, but would typically be no more than 100 mm high, preferably no more than 65 mm high. Letter heights between 30 and 50 mm have been found satisfactory.

It will be appreciated that in the rear light unit 85 the LEDs 93, which act as a conventional rear light, may be provided with conventional reflectors (not shown), and that the number of LEDs 93 may be different, for example the number of LEDs may typically be between one and ten on each side. Similarly, in the front light unit 95 the LEDs 103, which act as a conventional front light, may be provided with conventional reflectors (not shown), and that the number of LEDs 103 may be different, for example typically being between one and ten. The displays 80 are shown as a word in the rear light unit 85, and as a symbol in the front light unit 95, but it will be appreciated that they may both be words, or both symbols, or the rear light unit might show a symbol and the front light unit might show a word. For use in different countries, it may be an option to replace the stencil which forms the word or symbol e.g. the sheet 65 in the display 80 (as shown in FIG. 7), to show a word in a different language.

It should also be understood that, as an alternative, a front light unit may have the shape of the rear light unit 85, but providing white light; and a rear light unit may have the shape of the front light unit 95, but providing red light.

Figure 12A:
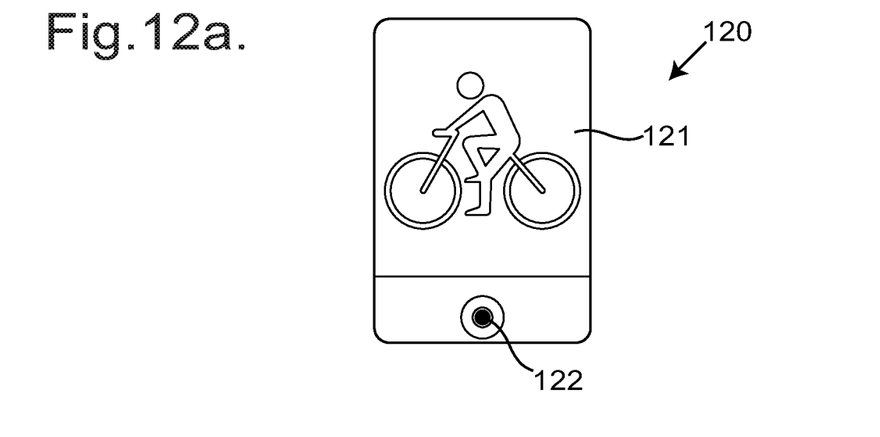
FIGS. 12a to 12c show the light-emitting faces of three alternative lights.

Referring now to FIG. 12, this shows the light-emitting face of three different lights. FIG. 12a shows a front light 120 which includes a display 121 showing a cyclist, below which is a conventional light source 122 comprising two LEDs in combination with a focusing lens arranged to produce a light beam inclined slightly below the horizontal (for example at 5° or 3.5°) when the front light 120 is upright. This arrangement minimises any interference (from the point of view of another road user) between the light from the light source 122 and the light from the display 121, and has been found to provide a further benefit in that the light from the light source 122 is perceived as underlining the light from the display 121. The display 121 may be equivalent to the display 80 described above.

Figure 12B:
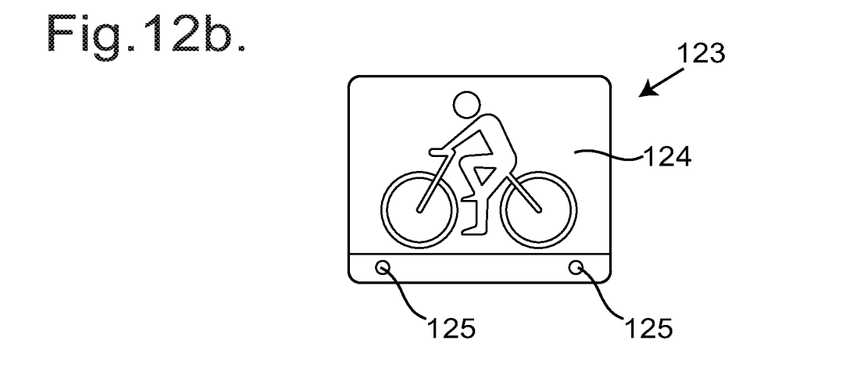

FIG. 12b shows a rear light 123, which includes a display 124 showing a symbol of a cyclist, below which are two spaced-apart light sources 125 each comprising an LED in combination with a focusing lens to produce a light beam, the combination the light beams from the two light sources 125 providing a wider angle over which the light can be seen, as is desirable for a rear light. The display 124 differs from the display 121 in emitting red light rather than white light.

Figure 12C:
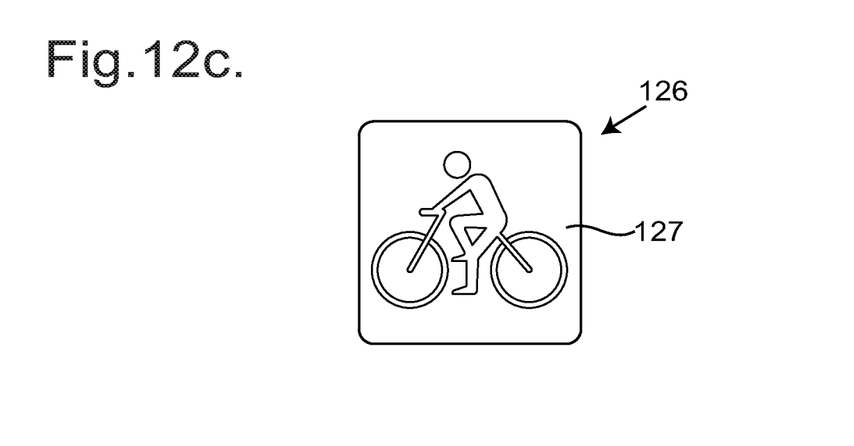

FIG. 12c shows a light 126 which might be either a front light, emitting white light, or a rear light, emitting red light. It comprises a display 127 showing a cyclist. The display 127 may be substantially identical to the display 121, if it is to be used as a front light, or may be substantially identical to the display 124 if it is to be used as a rear light. The light 126 does not provide the conventional functionality of a front or rear light, so it would preferably be used in conjunction with a separate conventional front or rear light.

Each display 40, 50, 55, 60, 70 and 80 may be powered by a dynamo, or by batteries. The use of batteries is particularly convenient (as described in relation to the rear light unit 85 and the front light unit 95), and the batteries may be primary batteries, or rechargeable (eg lithium ion) batteries.

It will be appreciated that each light that incorporates both a display showing a symbol or word and also a light source that produces a beam of light, may include a control unit so that different operation modes may be selected for example by means of a switch. The various different operation modes may enable the brightness of the display or of the light beam to be varied, and may enable either the display or the light beam to be either on steadily or flashed.

The examples above have all used light emitting displays which show a symbol or word. The invention is also applicable to a reflector, for example the reflector 20 may be replaced by a larger reflector of conventional construction combined with a stencil in the form of a symbol or word, such as the metal front plate 65 in which the word 53 or the symbol 58 is cut out as shown at 65a (as shown in FIGS. 5 and 7). Alternatively a reflector of conventional construction may be formed in the shape of a symbol or word. Although this would have some of the benefits described above, it would not be as clearly visible from a distance as the light emitting display.

What is claimed:

1. A lighting unit for a vulnerable road user, the lighting unit being a front light or a rear light for the vulnerable road user, wherein the lighting unit displays a symbol or word that identifies the category of vulnerable road user; wherein the means to display the symbol or word comprises an edge-lit transparent sheet, in combination with an opaque element which defines the symbol or word, such that the symbol or word is illuminated substantially uniformly, without any lens to focus the light from the symbol or word; and the lighting unit also includes, in addition to the means to display the symbol or word, at least one light source combined with a focusing lens to provide a beam or cone of light.

2. A lighting unit as claimed in claim 1 wherein the transparent sheet is provided with a textured surface on either its front surface or its rear surface.

3. A lighting unit as claimed in claim 1 wherein the rear surface is provided with a diffusely-scattering surface.

4. A lighting unit as claimed in claim 3 wherein the diffusely scattering surface is provided by grooves in the surface of the transparent sheet.

5. A lighting unit as claimed in claim 2 wherein the front surface has a textured surface in the form of micro-prisms.

6. A lighting unit as claimed in claim 2 wherein the textured surface is provided only in those portions where light is required to illuminate the symbol or word.

7. A lighting unit as claimed in claim 1 wherein each light source to provide a beam or cone of light enables the lighting unit to comply with the requirements for a front light or for a rear light for the vulnerable road user.

8. A lighting unit as claimed in claim 7 wherein the light source to provide a beam or cone of light comprises a plurality of LEDs.

9. A lighting unit as claimed in claim 1 wherein each light source to provide a beam or cone of light is below the symbol or word display means, when the lighting unit is upright, and is arranged to produce a beam or cone of light inclined below the horizontal.

10. A lighting unit as claimed in claim 1 comprising a control unit to control the mode of operation of the light source to provide a beam or cone of light, and of the means to display the symbol or word, so that the light source to provide a beam or cone of light, or the symbol or word display that is arrangeable to flash, or their brightness is variable.

11. A combination of a first lighting unit comprising the lighting unit of claim 1, wherein the first lighting unit is a front light for the vulnerable road user, and a second lighting unit, wherein the second lighting unit displays a symbol or word that identifies the category of vulnerable road user; wherein the means to display the symbol or word comprises an edge-lit transparent sheet, in combination with an opaque element which defines the symbol or word, such that the symbol or word is illuminated substantially uniformly, without any lens to focus the light from the symbol or word; and the lighting unit also includes, in addition to the means to display the symbol or word, at least one light source combined with a focusing lens to provide a beam or cone of light, and wherein the second lighting unit is a rear light for the vulnerable road user, wherein the first lighting unit and the second lighting unit are adapted to clip together.

12. A lighting unit as claimed in claim 1 also comprising a white backing plate.

13. A lighting unit as claimed in claim 1 wherein each light source to provide a beam or cone of light is above the symbol or word display means, when the lighting unit is upright.

14. A lighting unit as claimed in claim 1 wherein the beam or cone of light is inclined below the horizontal at between 3.5° and 5°.

* * * * *